INVENTORS
WILLIAM H. R. ANDREW
JOSEPH H. MULHERIN
ATTORNEYS 3,404,558
STRAIN FIELD DISPLACEMENT MEASURING DEVICE
William H. R. Andrew, Philadelphia, Pa., and Joseph H. Mulherin, Cherry Hill, N.J., assignors to the United States of America as represented by the Secretary of the Army
Filed May 5, 1966, Ser. No. 548,371
4 Claims. (Cl. 73—15.6)

ABSTRACT OF THE DISCLOSURE

A strain field displacement measuring arrangement wherein a transducer measures strain of a slotted heavy test specimen that is subjected to large tensile loads. A sturdy frame including respective pairs of upper and lower adjusting guides, appropriately interconnected by pluralities of vertical columns with corresponding encompassing springs and horizontal guide rods, respectively carry predetermined roller bearing means and specimen clamping pins in a manner to obtain maximum flexibility for overcoming any initial specimen distortion.

---

The invention described herein may be manufactured and used by or for the Government for governmental purposes without the payment to us of any royalty thereon.

This invention relates to measuring devices, and more particularly, to strain field displacement measuring apparatus for slotted areas of heavy test specimens subjected to large tensile loads.

One of the objects of the invention is to provide such apparatus enabling measurement of maximum precision in motion on either side of the specimen.

Another object of the invention is to provide such apparatus having means for properly aligning a test specimen with respect to a supporting frame so as to minimize or eliminate binding conditions in the frame members under operative conditions.

These and other objects, features and advantages will become more apparent from the following description and accompanying drawings in which.

Figure 1:
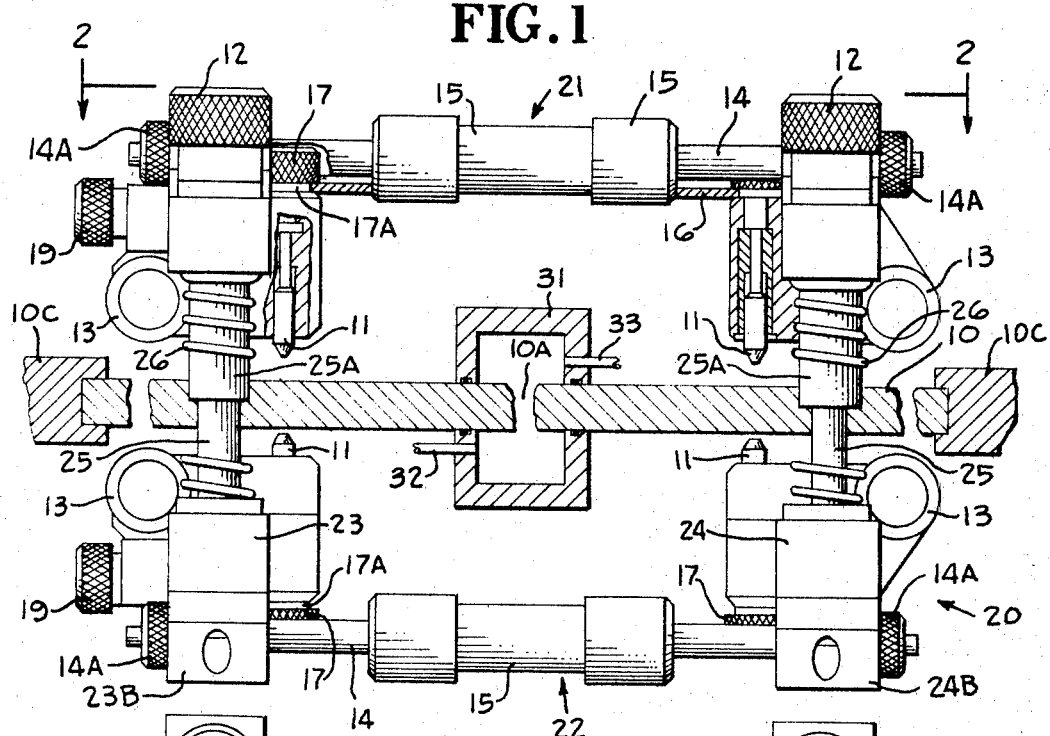
FIG. 1 is an elevational view, partially broken away in section, of an arrangement embodying the principles of the invention.

The sturdy fixture or frame, shown generally at 20, (FIG. 1) comprises a plurality of steel members assembled in a predetermined manner to define a pair of substantially rectangular frame portions shown generally at 21, 22. The lower frame portion 22 includes a pair of horizontally spaced, transversely extending lower adjusting guides 23, 24 whose end portions each appropriately support one of four vertically extending columns or supports 25, which together with their respective enlarged telescoping portion 25A are encompassed by a corresponding spring 26. Adjacent the guide end portions to which the columns or posts 25 are secured, each guide 23, 24 has a depending pair of brackets 23B, 24B each appropriately apertured in proper alignment to slidably receive and support corresponding end portions of horizontally spaced, longitudinally extending lower guide rods 14, the mid-length of each of which integrally carrying one of a set of spacer elements 15. Securing nuts 14A provide an outermost stop means for relative movement of the guide brackets 23B, 24B along rods 14, and the enlarged ends of the spacers 15 provide a similar innermost stop or abutment means.

At a central portion of each lower adjusting guide, a suitably journalled roller bearing 13 is provided to guide the test specimen 10, in proper alignment during operative tension loading by the specimen holders or clamping means 10C so that any binding of rods 14 is eliminated. Adjacently below one of the lower bearing journals is a threaded control knob 19 of a longitudinal slide arrangement 18 that traverses the transverse lower guide member 23. The slide 18 carries a pin 11 for engaging the specimen and a vertically aligned shaft portion 17A of a retaining knob 17. A similar pin 11 and knob 17 are carried by transverse lower guide member 24.

Figure 2:
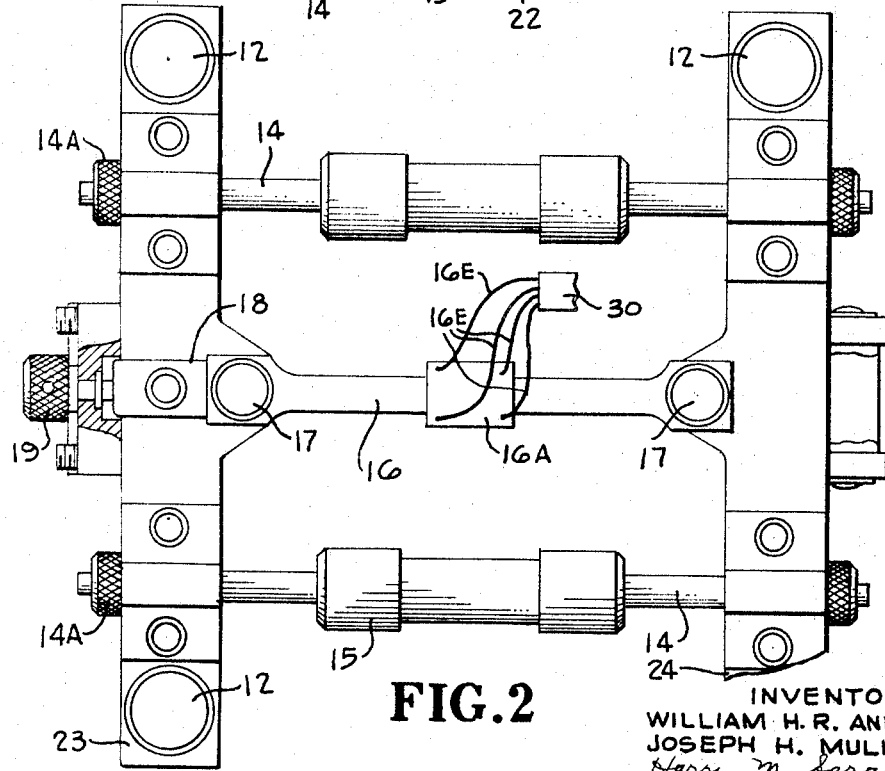
FIG. 2 is a sectional view taken along line 2—2 of FIG. 1 with certain portions removed.

The upper fixture portion 21 is substantially a complementary duplicate of the lower portion 22 and is movable theretoward in opposition to springs 26 and away therefrom by post knob 12 threadedly engaged upon the upper ends of each column 25 that telescopingly presses through the mating post 25A of the upper frame portion 21. A strain transducer 16 (FIGS. 1, 2) is extended across the collar or post portion 17A of the upper retaining knob 17 and carries a mid-length sensing element 16A (FIG. 2) which has appropriate electrical connections 16E to a Wheatstone bridge or other electrical measuring apparatus 30 capable of electrically indicating the strain field displacement of the test specimen 10. The specimen 10 has a rupture or slot 10A (FIG. 1) centrally of the fixture and it preferably is sealingly positioned within a gas or liquid pressure chamber 31 having a suitable inlet 32 and outlet 33 for providing as near environmental condition for the test area of the specimen.

A similar strain transducer 16 can be mounted across the pins 11 of the lower guide members 24 so that measurement of maximum precision may be obtained on both sides of the specimen.

Various modifications, changes or alterations may be resorted to without departing from the scope of the invention as defined in the appended claims.

We claim:
1. In a strain field displacement measuring arrangement having a transducer extending across horizontally spaced, parallel posts for measuring the strain at slotted areas of a heavy test specimen subjected to large tensile loads,
 a sturdy frame comprising a pair of horizontally spaced, longitudinally extending lower guide rods having their corresponding ends supported in respectively aligned portions of horizontally spaced, transversely extending lower adjusting guides, a vertical column having an encompassing spring and secured to each end portion of each lower adjusting guide, corresponding end portions of horizontally spaced, transversely extending upper adjusting guides on respective ones of said columns and seated on said springs, longitudinally extending upper guide rods having their ends supported in respectively aligned portions of said upper adjusting guides, a corresponding pair of ends of said upper guide rods being slidably mounted in said respective portions of one of said upper adjusting guides, and means for moving the upper members of said frame downwardly on said columns in opposition to said springs, roller bearing means carried by each of said adjusting guides for prepositioning said specimen in said frame,
 said posts being carried by corresponding ones of said upper adjusting guides, horizontally spaced, upper pin members depending from respective ones of said posts, and
 lower pin members carried by said lower adjusting guides and in substantial vertical alignment with the corresponding upper pin members,
 said pin members adapted to engage vertically aligned upper and lower surfaces of said specimen at longitudinally spaced positions therealong when said moving means are actuated.

2. The arrangement of claim 1 wherein said frame members are of steel construction.

3. The arrangement of claim 1 in which one of said posts and its upper pin members are supported on a slide member adjustable longitudinally across the central portion of the corresponding transverse upper adjusting guide.

4. The structure of claim 1 wherein a pressure fluid environmental chamber for a portion of said specimen is located in a central position intermediate said frame members.

References Cited

UNITED STATES PATENTS 2,183,909  12/1939  Henderson.

FOREIGN PATENTS 10,348  5/1908  Great Britain.

RICHARD C. QUEISSER, *Primary Examiner.*

JAMES H. WILLIAMSON, *Assistant Examiner.*